United States Patent
Park et al.

(10) Patent No.: US 7,835,426 B2
(45) Date of Patent: Nov. 16, 2010

(54) APPARATUS AND METHOD FOR PROVIDING TRANSMIT DIVERSITY IN MULTI-ANTENNA WIRELESS COMMUNICATION SYSTEMS

(75) Inventors: Jong Hyeon Park, San Jose, CA (US); Je Woo Kim, San Jose, CA (US); Ju Won Park, San Ramon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 730 days.

(21) Appl. No.: 11/452,471

(22) Filed: Jun. 13, 2006

(65) Prior Publication Data

US 2007/0217545 A1    Sep. 20, 2007

(51) Int. Cl.
*H04B 1/38* (2006.01)
*H04B 7/02* (2006.01)
*H04L 1/02* (2006.01)

(52) U.S. Cl. .................. 375/219; 375/267; 375/299
(58) Field of Classification Search ................ 375/219, 375/267, 299, 347; 455/101, 562.1, 103, 455/561; 370/338, 343, 480
See application file for complete search history.

(56) References Cited

U.S. PATENT DOCUMENTS

2005/0094741 A1\* 5/2005 Kuroda ................ 375/267

\* cited by examiner

*Primary Examiner*—Betsy L Deppe
(74) *Attorney, Agent, or Firm*—Michael J. DeHaemer, Jr.

(57) ABSTRACT

In an apparatus and method for providing transmit (Tx) diversity in a multi-antenna wireless communication system, Tx diversity is provided by estimating a channel to each antenna using a signal received from the antenna, estimating channel state information (CSI) from the first Tx node to each antenna using the estimated channel, and determining a signal to be transmitted to the antennas in different methods according to whether phase compensation is required for information to be transmitted using the estimated channel and the CSI.

14 Claims, 7 Drawing Sheets

APPARATUS AND METHOD FOR PROVIDING TRANSMIT DIVERSITY IN MULTI-ANTENNA WIRELESS COMMUNICATION SYSTEMS

PRIORITY

This application claims priority under 35 U.S.C. §119 to a Republic of Korea application entitled "Apparatus and Method for Providing Transmit Diversity in Multi-Antenna Wireless Communication System" filed in the Korean Intellectual Property Office on Mar. 14, 2006 and assigned Serial No. 2006-23743, the contents of which are incorporated herein by reference.

BACKGROUND OF THE INVENTION

1. Field of the Invention

The present invention relates generally to an apparatus and method for providing transmit diversity in a wireless communication system, and in particular, to an apparatus and method for providing transmit diversity in a wireless communication system having multiple antennas.

2. Description of the Related Art

In common, a wireless communication system is a system developed for users to perform communication without the limitation of wired communication. The wireless communication system has been progressed from a system for providing basic voice communication to a system for providing a high-speed data service. Thus, a method of transmitting data at a higher rate has been required. Various methods of transmitting data at a high rate are used, and one of them is a method of providing transmit diversity using multiple antennas. Another one is a method of transmitting data at a high rate using multi-input multi-output (MIMO) orthogonal frequency division multiplexing (OFDM) technology. Research and development have been being continued for improving communication quality with performing higher-speed communication using these technologies in a mixed manner.

One of technology standards using the above-described methods is "IEEE P802.16-REVd/D5-2004, Part 16: Air Interface for Fixed Broadband Wireless Access Systems", which is a wideband wireless communication standard aiming at a fixed or mobile wireless Internet service. In IEEE P802.16-REVd, a single media access control layer (MAC) and four physical layers (PHYs) are defined. Among the four PHYs of IEEE P802.16-REVd, an OFDM or OFDMA method takes attentions, and a large portion of a MIMO based system standard including space time coding (STC) is included. For the convenience of description, the contents of IEEE P802.16d are called OFDM.

A data transmission structure of the OFDM method will now be described.

Figure 1:
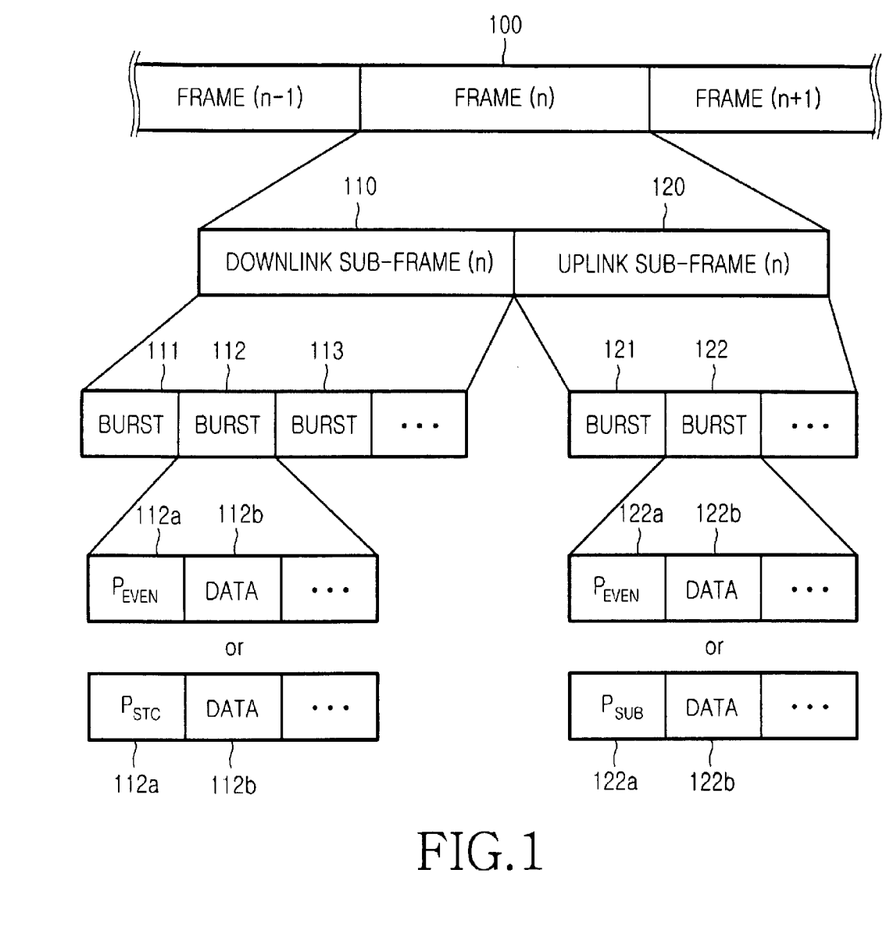
FIG. 1 illustrates a frame structure suggested in IEEE 802.16d.

FIG. 1 illustrates a frame structure suggested in IEEE 802.16d.

FIG. 1 shows a plurality of frames, an $(n-1)^{th}$ frame, an $n^{th}$ frame 100, and an $(n+1)^{th}$ frame. The frames have the same format. Thus, the $n^{th}$ frame 100 will now be described.

The $n^{th}$ frame 100 is composed of an $n^{th}$ sub-frame (n) 110 of a downlink (DL) and an $n^{th}$ sub-frame (n) 120 of an uplink (UL). Each of the $n^{th}$ sub-frame (n) 110 of the DL and an $n^{th}$ sub-frame (n) 120 of the UL includes a plurality of bursts. That is, the $n^{th}$ sub-frame (n) 110 of the DL includes a plurality of DL bursts 111, 112, 113, . . . , and the $n^{th}$ sub-frame (n) 120 of the UL includes a plurality of UL bursts 121, 122, 123, . . . .

Since each of the DL bursts and the UL bursts has the same structure, only the DL burst 112 and the UL burst 122 will be described. The DL burst 112 includes a preamble symbol 112a at the beginning and data symbols 112b, . . . , and the UL burst 122 includes a preamble symbol 122a at the beginning and data symbols 122b, . . . . The DL preamble symbol 112a and the UL preamble symbol 112a may have different formats.

That is, the DL preamble symbol 112a can be defined in a $P_{EVEN}$ or $P_{STC}$ pattern, and the UL preamble symbol 112a can be defined in a $P_{EVEN}$ or $P_{SUB}$ pattern. Preamble patterns will now be described.

The patterns for preamble symbols are classified into several types according to the usage of the preamble symbols. A first preamble pattern is a $P_{ALL}$ pattern, and a second preamble pattern is a $P_{SUB}$ pattern. The $P_{ALL}$ pattern and the $P_{SUB}$ pattern are defined as Equation 1 and Equation 2, respectively.

$$P_{ALL}(k=-100:100) = [1-j, 1-j, -1-j, 1+j, 1-j, 1-j, \quad (1)$$
$$-1+j, 1-j, 1-j, 1-j, 1+j, -1-j, 1+j, 1+j, -1-j,$$
$$1+j, -1-j, -1-j, 1-j, -1+j, 1-j, 1-j, -1-j, 1+j,$$
$$1-j, 1-j, -1+j, 1-j, 1-j, 1-j, 1+j, -1-j, 1+j,$$
$$1+j, -1-j, 1+j, -1-j, -1-j, 1-j, -1+j, 1-j, 1-j,$$
$$-1-j, 1+j, 1-j, 1-j, -1+j, 1-j, 1-j, 1-j, 1+j,$$
$$-1-j, 1+j, 1+j, -1-j, 1+j, -1-j, -1-j, -1+j, 1+j,$$
$$1+j, 1-j, -1+j, 1+j, 1+j, 1+j, -1-j, 1+j, 1+j, 1+j,$$
$$-1+j, 1-j, -1+j, -1+j, -1+j, 1-j, -1+j, 1-j, 1-j, 1+j,$$
$$-1-j, -1-j, -1-j, -1+j, 1-j, -1-j, -1-j, 1+j,$$
$$-1-j, -1-j, -1-j, 1-j, -1+j, 1-j, 1-j, -1+j, 1-j,$$
$$-1+j, -1+j, -1-j, 1+j, 0, -1-j, 1+j, -1+j, -1+j,$$
$$-1-j, 1+j, 1+j, 1+j, -1-j, 1+j, 1-j, 1-j, 1-j,$$
$$-1+j, -1+j, -1+j, -1+j, 1-j, -1-j, -1-j, -1+j,$$
$$1-j, 1+j, 1+j, -1+j, 1-j, 1-j, 1-j, -1+j, 1-j,$$
$$-1-j, -1-j, -1-j, 1+j, 1+j, 1+j, 1+j, -1-j, -1+j,$$
$$-1+j, 1+j, -1-j, 1-j, 1-j, 1+j, -1-j, -1-j, -1-j,$$
$$1+j, -1-j, -1+j, -1+j, -1+j, 1-j, 1-j, 1-j, 1-j,$$
$$-1+j, 1+j, 1+j, -1-j, 1+j, -1+j, -1+j, -1-j, 1+j,$$
$$1+j, 1+j, -1-j, 1+j, 1-j, 1-j, -1+j, -1+j,$$
$$-1+j, -1+j, 1-j, -1-j, -1-j, 1-j, -1+j, -1-j,$$
$$-1-j, 1-j, -1+j, -1+j, -1+j, 1-j, -1+j, 1+j,$$
$$1+j, 1+j, -1-j, -1-j, -1-j, -1-j, 1+j, 1-j, 1-j]$$

$$P_{SUB}(k=-100:100) = [1+j, 1+j, -1-j, 1+j, -1+j, 1+j, \quad (2)$$
$$1+j, 1+j, -1-j, -1-j, 1-j, -1-j, 1-j, 1+j, 1-j,$$
$$1+j, 1+j, -1-j, -1-j, 1+j, 1-j, 1+j, -1-j, 1+j,$$
$$1+j, 1+j, 1+j, -1-j, 1+j, -1+j, 1+j, 1+j, 1+j,$$
$$-1-j, -1-j, 1-j, -1-j, -1-j, 1+j, 1-j, 1+j, 1+j,$$

-continued $-1-j, -1-j, 1+j, 1-j, 1+j, -1-j, 1+j, 1+j, 1+j,$ $1+j, -1-j, 1+j, -1+j, 1+j, 1+j, 1+j, -1-j, -1-j,$ $1-j, -1-j, 1-j, -1-j, -1+j, -1-j, -1-j, 1+j, 1+j,$ $-1-j, -1+j, -1-j, 1+j, -1-j, -1-j, 1+j, -1-j,$ $1+j, -1+j, 1+j, 1+j, 1+j, -1-j, -1-j, 1-j, -1-j,$ $1-j, -1-j, -1+j, -1-j, -1-j, 1+j, 1+j, -1-j,$ $-1+j, -1-j, 1+j, -1-j, -1-j, 0, 1+j, 1+j, -1-j,$ $1+j, -1+j, 1+j, 1+j, 1+j, -1-j, -1-j, 1-j, -1-j,$ $1-j, 1+j, 1-j, 1+j, 1+j, -1-j, -1-j, 1+j, 1-j, 1+j,$ $-1-j, 1+j, 1+j, -1-j, -1-j, 1+j, -1-j, 1-j, -1-j,$ $-1-j, -1-j, 1+j, 1+j, -1+j, 1+j, 1-j, -1-j, -1+j,$ $-1-j, -1-j, 1+j, 1+j, -1-j, -1+j, -1-j, 1+j, -1-j,$ $-1-j, -1-j, -1-j, 1+j, -1-j, 1-j, -1-j, -1-j,$ $-1-j, 1+j, 1+j, -1+j, 1+j, -1+j, 1+j, 1-j, 1+j,$ $1+j, -1-j, -1-j, 1+j, 1-j, 1+j, -1-j, 1+j, 1+j,$ $1+j, 1+j, -1-j, 1+j, -1+j, 1+j, 1+j, 1+j, -1-j,$ $-1-j, 1-j, -1-j, -1-j, -1-j, -1+j, -1-j, -1-j,$ $1+j, 1+j, -1-j, -1+j, -1-j, 1+j, -1-j, -1-j j]$ The index k in Equations 1 and 2 is an index value based on a frequency offset index (FOI). In Equations 1 and 2, when k<−100 or k>100, each of the $P_{ALL}$ pattern and the $P_{SUB}$ pattern has a value of '0'.

A third preamble pattern is the $P_{EVEN}$ pattern, and a fourth preamble pattern is a $P_{ODD}$ pattern. The $P_{EVEN}$ pattern and the $P_{ODD}$ pattern are defined as Equation 3 and Equation 4, respectively.

$$P_{EVEN}(k) = \begin{Bmatrix} \sqrt{2} \cdot P_{ALL} & k_{mod2} = 0 \\ 0 & k_{mod2} \neq 0 \end{Bmatrix} \quad (3)$$

$$P_{ODD}(k) = \begin{Bmatrix} 0 & k_{mod2} = 0 \\ \sqrt{2} \cdot P_{ALL} & k_{mod2} \neq 0 \end{Bmatrix} \quad (4)$$

In Equations 3 and 4, the FOI based index k=−N/2, −N/2+1, ..., −1, 0, 1, ..., N/2−2, and N/2−1 (N=256).

A final preamble pattern is the $P_{STC}$ pattern used when two antennas are used. The $P_{STC}$ pattern is defined as Equation 5.

$$P_{STC}(k) = \begin{Bmatrix} P_{EVEN}(k) & \text{for first antenna path} \\ P_{ODD}(k) & \text{for second antenna path} \end{Bmatrix} \quad (5)$$

As illustrated in Equations 1 through 5, the preamble patterns have the following characteristics. In the $P_{EVEN}$ pattern, a signal exists in only even sub-carriers not odd sub-carriers. In the $P_{ODD}$ pattern, a signal exists in only odd sub-carriers not even sub-carriers. In the $P_{SUB}$ pattern, a signal exists in both even sub-carriers and odd sub-carriers. In the $P_{STC}$ pattern, a first antenna ant0 uses the $P_{EVEN}$ pattern, and a second antenna ant1 uses the $P_{ODD}$ pattern.

An OFDM burst structure available from the preambles will now be described with reference to FIG. 2.

Figure 2:
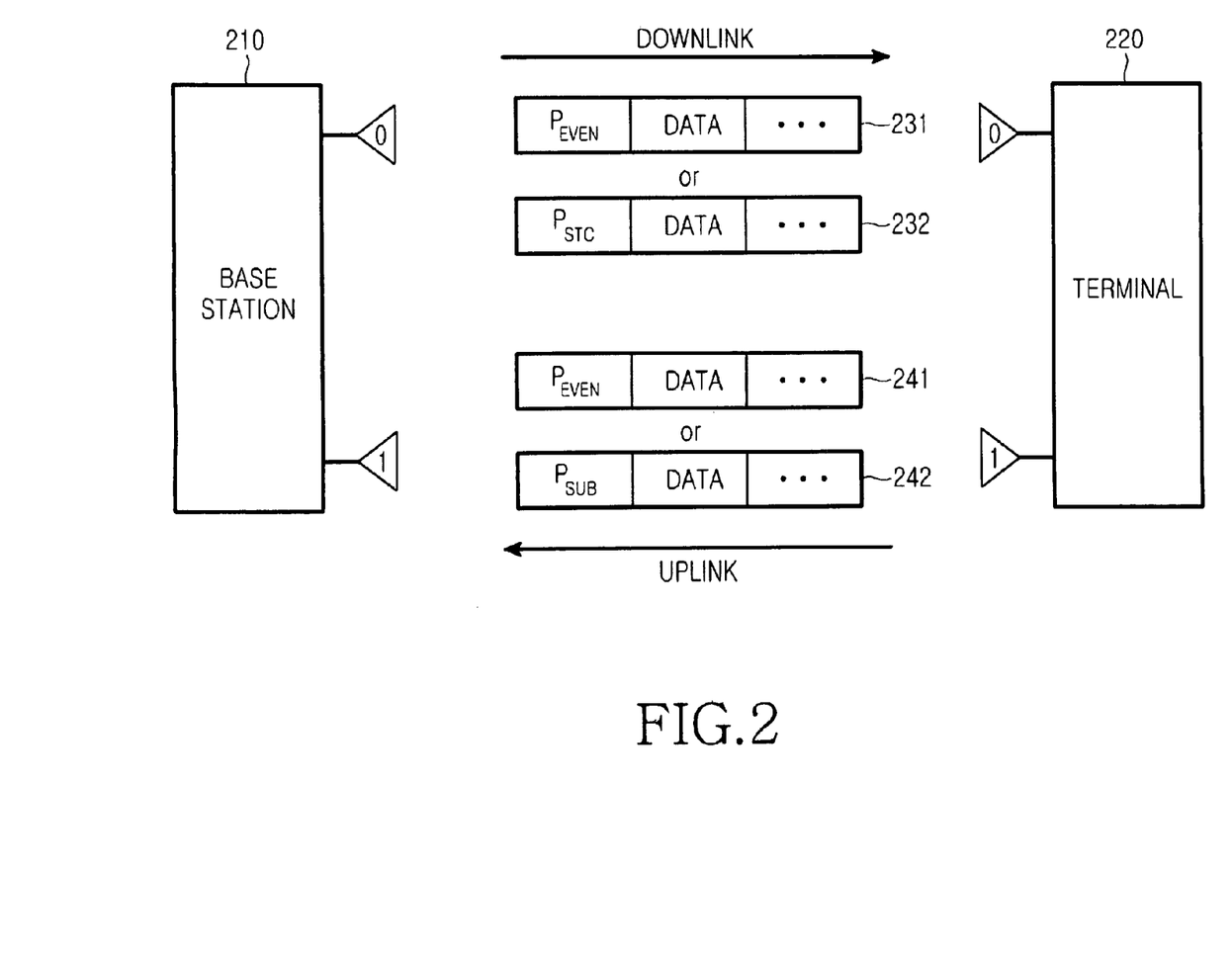
FIG. 2 illustrates an OFDM burst structure when a burst is transmitted in an OFDM method between a transmitter and a receiver.

FIG. 2 illustrates an OFDM burst structure when bursts are transmitted in an OFDM method between a transmitter and a receiver. A structure and a transmission method of OFDM bursts transmitted and received in the OFDM method between the transmitter and the receiver will now be described with reference to FIG. 2.

FIG. 2 illustrates an access point or base station 210 and a terminal 220 transmitting and receiving data in the OFDM method. A direction from the base station 210 to the terminal 220 is called downlink, and a direction from the terminal 220 to the base station 210 is called uplink. Thus, a DL is a link formed from the base station 210 to the terminal 220, and a UL is a link formed from the terminal 220 to the base station 220. In addition, FIG. 2 illustrates that each of the base station 210 and the terminal 220 has two antennas. Thus, for the base station 210 and the terminal 220, an antenna numbered as 0 denotes a first antenna, and an antenna numbered as 1 denotes a second antenna.

When a MIMO OFDM system having the above-described configuration is constructed based on the frame structure and the preamble structure suggested in IEEE P802.16d, all configurable burst structures are shown in FIG. 2. That is, a DL burst structure can be a "$P_{EVEN}$ pattern+data symbols" format 231 or a "$P_{STC}$ pattern+data symbols" format 232. A UL burst structure can be a "$P_{EVEN}$ pattern+data symbols" format 241 or a "$P_{SUB}$ pattern+data symbols" format 242.

A preamble symbol included in a transmitted burst is used to estimate a channel in the receiver. Thus, if the receiver cannot receive the preamble symbol or perform the channel estimation from the preamble symbol, the receiver cannot correctly recover transmitted data. Thus, the preamble symbol is a very important symbol in the MIMO OFDM system.

As described above, if a preamble uses the $P_{EVEN}$ pattern, the $P_{ODD}$ pattern, or the $P_{STC}$ pattern in the burst structure of the MIMO OFDM system, only even or odd sub-carriers are transmitted without transmitting all sub-carriers. In this case, the receiver estimates a channel for the even or odd sub-carriers for the channel estimation. Then, the receiver must estimate a channel for the unused odd or even sub-carriers through interpolation from the channel estimated using the preamble.

In a wireless communication system, the channel estimation is very important. Thus, in general, various schemes are used to estimate a channel in the wireless communication system. One of the channel estimation schemes is a diversity scheme. The diversity scheme is divided into a receive (Rx) diversity scheme and a transmit (Tx) diversity scheme.

In the wireless communication system, a MIMO scheme is used to transmit data at a high rate. The MIMO scheme is a scheme for improving transmission efficiency by increasing the number of transmit streams using a plurality of antennas. Theoretically, if the MIMO scheme is used, since the number of transmit and receive antennas increases without an additional increase of frequency bandwidth, the serviceable data capacity increases linearly proportional to the increase of the number of transmit and receive antennas.

Besides the MIMO scheme, techniques using the diversity scheme are disclosed in various fields of the wireless communication system.

The Rx diversity scheme will now be described. When the Rx diversity scheme is used, the receiver must has a plurality of antennas in general. Thus, it is difficult to implement the receiver, and complexity of the receiver increases.

The Tx diversity scheme is divided into an open-loop scheme and a closed-loop scheme according to whether feedback information is received. In the Tx diversity scheme, data is transmitted by increasing Tx diversity by providing a specific gain to a signal, antenna, or symbol to be transmitted according to the open-loop scheme or the closed-loop scheme. Then, the receiver can more efficiently receive the transmitted data. That is, if the Tx diversity scheme is used, symbols can be more safely transmitted through a channel.

Tx diversity schemes disclosed till now will be described.

Firstly, a Tx diversity scheme of an STC scheme is suggested in U.S. Pat. No. 6,775,329 invented by Alamouti, et al. This scheme is a scheme of obtaining diversity in a space axis and a time axis using more than two antennas. The scheme suggested by Alamouti, et al. is a scheme of performing Tx diversity using a relatively simple structure and performs encoding in the time axis to have a correlation between adjacent symbols using more than two antennas. Thus, the scheme suggested by Alamouti, et al. must have a structure for gathering at least two symbols for STC and processing the gathered symbols. That is, this limitation introduces that the scheme suggested by Alamouti, et al. cannot be used unless a standard specification supports a scheme of gathering at least two symbols and processing the gathered symbols.

Secondly, a Tx diversity scheme using an "equal power joint maximum ratio combining" scheme based on a beam-forming scheme is suggested in U.S. Pat. No. 6,785,520 invented by Sugar, et al. However, the scheme suggested by Sugar, et al. has a problem of using the beam-forming scheme. That is, when the beam-forming scheme is used, a receiver must calculate a weight vector having an optimal solution, and Tx diversity must be performed by applying the weight vector to a transmission signal. In general, a calculation process for obtaining the weight vector for the beam-forming is very complicated. Furthermore, a complex calibration process is needed to obtain the Tx diversity, and a spectrum of the transmission signal must follow a standard specification.

Thirdly, a Tx diversity scheme is suggested in U.S. Pat. No. 6,763,225 invented by Farmine, et al. This scheme is a "phase alignment" Tx diversity scheme, which can be applied to a Code Division Multiple Access-Time Division Duplex (CDMA-TDD) system. The scheme suggested by Farmine, et al. is based on a scheme for a base station to receive a channel weight vector fed back from each of a plurality of mobile terminals and process the fed-back channel weight vector. Since the base station uses a phase alignment scheme between weight vectors of mobile terminals to align phases of channel weight vectors of all mobile terminals, the scheme suggested by Farmine, et al. is simpler than a conventional joint optimization scheme. However, since this scheme has a structure applied to a CDMA TDD scheme and uses channel weight vectors fed back from terminals, additional hand-shaking is necessary, and since the phase alignment is applied to weight vectors between terminals in a time domain processing method, a filter is necessary, and thereby, implementation is complicated.

Besides, a Tx diversity scheme applicable to a CDMA-TDD system is suggested in U.S. Pat. No. 6,754,286 invented by Hottinen, et al., and a Tx diversity scheme based on an OFDM system is suggested in U.S. Pat. No. 6,473,393 invented by Ariyavisitakul, et al. In addition, a scheme of optimizing a signal-to-noise ratio (SNR) through an interactive process using a time domain processing method using a "tapped delay line filter" is suggested in U.S. Pat. No. 6,873,651 invented by Tesfai, et al., and a Tx diversity scheme of optimizing an SNR using a partial channel state information (CSI) transmission scheme and a beam-forming scheme is suggested in U.S. Pat. No. 6,862,271 invented by Medvedev, et al. However, the above-described schemes require a series of hand-shaking or are still complicated.

That is, the above-described schemes are unreasonable to be applied to the OFDM scheme, or even if the above-described schemes can be applied to the OFDM scheme, terminals are complicated or a series of hand-shaking between a transmitter and a receiver is required, thereby resulting the waste of a bandwidth.

SUMMARY OF THE INVENTION

An object of the present invention is to substantially solve at least the above problems and/or disadvantages and to provide at least the advantages below. Accordingly, an object of the present invention is to provide a transmit (Tx) diversity apparatus and method applicable to an OFDM wireless communication system.

Another object of the present invention is to provide an apparatus and method for providing Tx diversity in an OFDM wireless communication system without largely increasing terminal complexity.

A further object of the present invention is to provide an apparatus and method for providing Tx diversity with reducing the waste of a wireless bandwidth in an OFDM wireless communication system.

According to one aspect of the present invention, there is provided an apparatus comprising a first transmit (Tx) node having one or two antennas and a second Tx node having more than two antennas, the second Tx node providing Tx diversity using a signal received from the first Tx node, the apparatus comprising: a channel estimator for outputting channel estimation values by estimating a channel to each antenna using a signal received from the antenna; a channel state information (CSI) estimator for estimating CSI from the first Tx node to each antenna using the channel estimation values; and a diversity processing unit for determining a signal to be transmitted to the antennas in different methods according to whether phase compensation is required for information to be transmitted using the channel estimation values and the CSI.

According to another aspect of the present invention, there is provided a method for a second transmit (Tx) node having an antenna to provide Tx diversity using a signal received from a first Tx node having two antennas, the method comprising the steps of: outputting channel estimation values by estimating a channel to each antenna using a signal received from the antenna; estimating channel state information (CSI) from the first Tx node to each antenna using the channel estimation values; and determining a signal to be transmitted to the antennas in different methods according to whether phase compensation is required for information to be transmitted using the channel estimation values and the CSI.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail. However, the terminology described below is defined considering functions in the present invention and may vary according to a user or play of application. Thus, the definitions should be understood based on all the contents of the specification.

A new MIMO OFDM transmit (Tx) diversity scheme supporting the IEEE 802.16d (OFDM) standard specification and compliant will be described. In a Tx diversity scheme according to a preferred embodiment of the present invention, a Tx diversity method suitable for each of downlink and uplink burst structures is used, and thus a Tx diversity processing process according to a preferred embodiment of the present invention is applied.

In addition, the Tx diversity scheme according to a preferred embodiment of the present invention can be applied to IEEE 802.16d (OFDM) systems, other systems, and new systems in the future. In the description below, it is assumed for the convenience of description that the number of antennas is 2. However, the present invention can be applied to more than two antennas.

Figure 3:
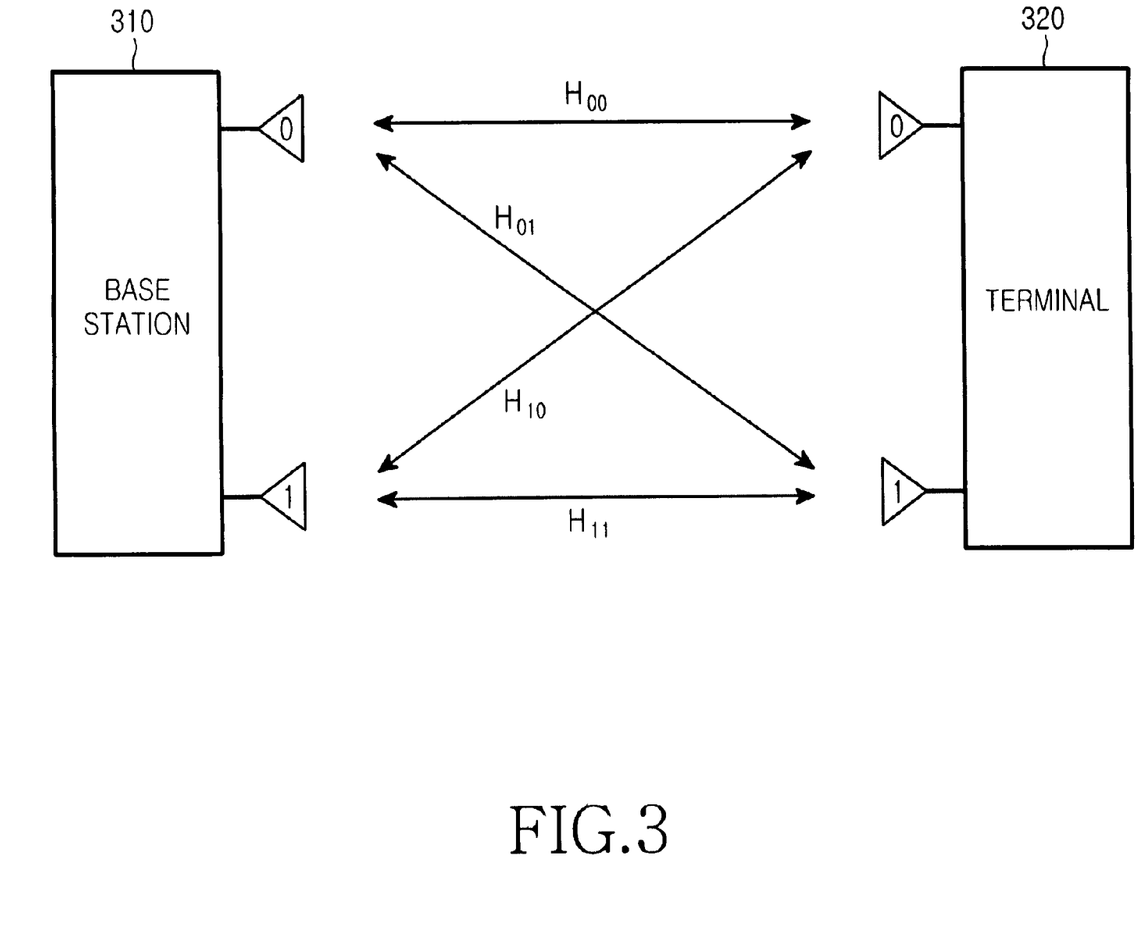
FIG. 3 is a conceptual diagram for explaining channels for each antenna in a system according to a preferred embodiment of the present invention.

FIG. 3 is a conceptual diagram for explaining channels for each antenna in a system according to a preferred embodiment of the present invention.

Referring to FIG. 3, each of an access point or base station 310 and a terminal 320 includes a first antenna 0 and a second antenna 1. If necessary, it can be configured that the base station 310 or the terminal 320 includes only one antenna. In addition, each of the base station 310 and the terminal 320 can include more than two antennas only if the number of antennas of a receiver is more than or equal to that of a transmitter.

As described above, it is assumed that each of the base station 310 and the terminal 320 includes one or two antennas.

In FIG. 3, $H_{00}$ denotes a channel between the first antenna 0 of the base station 310 and the first antenna 0 of the terminal 30, $H_{01}$ denotes a channel between the first antenna 0 of the base station 310 and the second antenna 1 of the terminal 320, $H_{10}$ denotes a channel between the second antenna 1 of the base station 310 and the first antenna 0 of the terminal 320, and $H_{11}$ denotes a channel between the second antenna 1 of the base station 310 and the second antenna 1 of the terminal 320.

If the base station 310 uses only one antenna, the second antenna 1 of the base station 310 does not exist, and thereby, the channels $H_{10}$ and $H_{11}$ do not exist.

A method of providing Tx diversity according to a preferred embodiment of the present invention will now be described with reference to FIG. 3.

In the present invention, the closed-loop Tx diversity scheme is used. In the closed-loop Tx diversity scheme according to the present invention, a first Tx node uses a conventional transmission method as described above. That is, if the first Tx node is the base station 310, a burst signal is transmitted in the "$P_{EVEN}$+data" or "$P_{STC}$+data" format, and if the first Tx node is the terminal 320, a burst signal is transmitted in the "$P_{EVEN}$+data" or "$P_{SUB}$+data" format. Then, a second Tx node receives the burst signal and transmits data to the first Tx node by applying the Tx diversity scheme according to the present invention to the data.

The second Tx node providing Tx diversity according to the current embodiment must include more than two antennas. This is the fundamental for providing Tx diversity. However, the first Tx node can include one or two antennas.

In more detail, if the base station 310 provides Tx diversity, the terminal 320 becomes the first Tx node. Thus, the base station 310 must include more than two antennas while the terminal 320 can include one or two antennas. On the contrary, if the terminal 320 provides Tx diversity, the base station 310 becomes the first Tx node. Thus, the terminal 320 must include more than two antennas while the base station 310 can include one or two antennas.

In the above-described two cases, a Tx diversity scheme has three occasions. The Tx diversity scheme according to a preferred embodiment of the present invention can be provided for the three occasions and will now be described.

Figure 4:
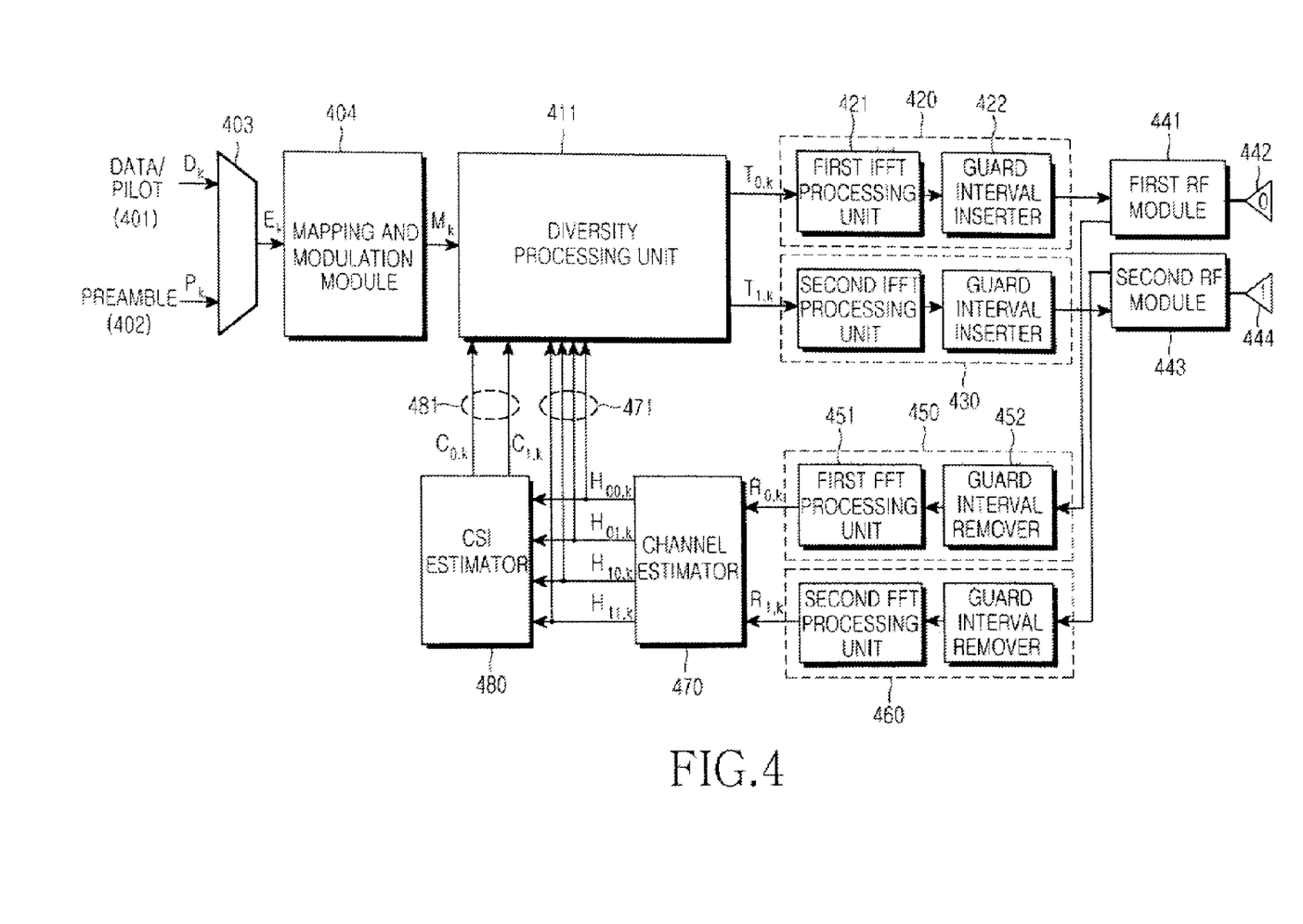
FIG. 4 is a block diagram of a transmitter for providing Tx diversity according to a preferred embodiment of the present invention.

FIG. 4 is a block diagram of a transmitter for providing Tx diversity according to a preferred embodiment of the present invention.

In FIG. 4, the transmitter for providing Tx diversity is the second Tx node. Thus, the second Tx node can be the base station 310 or the terminal 30.

As described above, since the closed-loop Tx diversity scheme is used in the present invention, the transmitter receives a signal transmitted from the first Tx node through a first antenna 442 and a second antenna 444. The first Tx node can transmit the signal using one or two antennas as described above. In the current embodiment, the signal received through the first antenna 442 and the second antenna 444 can be transmitted from one or two antennas.

The signal received through the first antenna 442 is input to a first radio frequency (RF) module 441, and the signal received through the second antenna 444 is input to a second RF module 443. Each of the first and second RF modules 441 and 443 converts the received high frequency signal to a baseband signal. The baseband signals converted by the first and second RF modules 441 and 443 are input to first and second OFDM processing units 450 and 460, respectively, to be processed in an OFDM system. Since the first and second OFDM processing units 450 and 460 have the same structure, only a process of processing the baseband signal output from the first RF module 441 will be described.

A guard interval remover 452 of the first OFDM processing unit 450 removes a cyclic prefix symbol, which was inserted in a transmission process, from the baseband signal output from the first RF module 441. The cyclic prefix symbol is used to prevent inter-symbol interference due to multiple paths in the OFDM scheme. The signal from which a guard interval is removed by the guard interval remover 452 is input to a first fast Fourier transform (FFT) processing unit 451. The first FFT processing unit 451 converts the signal converted in a time domain to a signal in a frequency domain. The above-described procedures are identically performed by the second OFDM processing unit 460 processing the baseband signal output from the second RF module 443.

The signal converted in the frequency domain by the first OFDM processing unit 450 is the signal received through the first antenna 442, and the signal converted in the frequency domain by the second OFDM processing unit 460 is the signal received through the second antenna 444. Thus, if it is assumed that the signal output from the first OFDM processing unit 450 is called $R_{0,k}$ and the signal output from the second OFDM processing unit 460 is called $R_{1,k}$, the signal $R_{0,k}$ output from the first OFDM processing unit 450 and the signal $R_{1,k}$ output from the second OFDM processing unit 460 are obtained using Equation 6.

$$R_{0,k} = FFT \text{ output of antenna 0 path}, \ k = -\frac{N}{2}, \ldots, \frac{N}{2}-1 \quad (6)$$

$$R_{1,k} = FFT \text{ output of antenna 1 path}, \ k = -\frac{N}{2}, \ldots, \frac{N}{2}-1$$

The signals $R_{0,k}$ and $R_{1,k}$ output from the first and second OFDM processing units 450 and 460 are input to a channel estimator 470.

The channel estimator 470 estimates wireless channels from the input signals $R_{0,k}$ and $R_{1,k}$. This estimation will be described with reference to FIG. 3. It is assumed that the first Tx node is the terminal 320 and the second Tx node is the base station 310. If the terminal 320 has a single antenna, the channels estimated by the base station 310 are the channel $H_{00}$ from the first antenna 0 of the terminal 320 to the first antenna 0 of the base station 310 and the channel $H_{10}$ from the first antenna 0 of the terminal 320 to the second antenna 1 of the base station 310. If the terminal 320 has two antennas, the channels estimated by the base station 310 are the channels $H_{00}$ and $H_{10}$, the channel $H_{01}$ from the second antenna 1 of the terminal 320 to the first antenna 0 of the base station 310, and the channel $H_{11}$ from the second antenna 1 of the terminal 320 to the second antenna 1 of the base station 310.

The estimated channels 471 are obtained using Equation 7.

$$H_{00,k} = \text{Estimation of } H_{00}, \ k = -\frac{N}{2}, \ldots, \frac{N}{2}-1 \quad (7)$$

$$H_{01,k} = \begin{cases} 0 & \text{if one antenna} \\ \text{Estimation of } H_{01}, & \text{if two antennas} \end{cases} k = -\frac{N}{2}, \ldots, \frac{N}{2}-1$$

$$H_{10,k} = \text{Estimation of } H_{10}, \ k = -\frac{N}{2}, \ldots, \frac{N}{2}-1$$

$$H_{11,k} = \begin{cases} 0 & \text{if one antenna} \\ \text{Estimation of } H_{11}, & \text{if two antennas} \end{cases} k = -\frac{N}{2}, \ldots, \frac{N}{2}-1$$

Equation 7 is an illustration when it is assumed that the second Tx node is the base station 310 and the first Tx node is the terminal 30. Thus, as illustrated in Equation 7, if the terminal 320 has only one antenna, the estimated channels $H_{01,k}$ and $H_{11,k}$ do not exist. If the terminal 320 has two antennas, all the channel estimation values are valid. The channel estimator 470 can estimate channels using Equation 7. In this specification, a channel estimation method will not be described in detail because it will be understood by those skilled in the art that channel estimation from antennas is generally possible in a MIMO system when the number of antennas of a receiver is equal to or more than that of a transmitter. In the present invention, the signal transmitted from the first Tx node to the second Tx node satisfies the conditions for the channel estimation in the MIMO system.

Thus, even if a system using multiple antennas uses any channel estimation method, the present invention can be applied to the system. Accordingly, the present invention is not limited to any channel estimation method, and its detailed description is omitted.

When the channel estimation is performed by the channel estimator 470 using Equation 7, the channel estimation values are input to a CSI estimator 480 and a diversity processing unit 411. An operation of the CSI estimator 480 will now be described first. The CSI estimator 480 estimates CSI using the channel estimation values. The CSI estimation is performed using Equation 8.

$$C_{0,k} = |H_{00,k}|^2 + |H_{10,k}|^2, \ k = -\frac{N}{2}, \ldots, \frac{N}{2}-1 \quad (8)$$

$$C_{1,k} = |H_{01,k}|^2 + |H_{11,k}|^2, \ k = -\frac{N}{2}, \ldots, \frac{N}{2}-1$$

In Equation 8, $C_{0,k}$ denotes CSI of channels to a first antenna, and $C_{1,k}$ denotes CSI of channels to a second antenna. The CSI estimated using Equation 8 is input to the diversity processing unit 411.

The diversity processing unit 411 performs diversity transmission using the channel estimation values 481 of Equation 7, which are received from the channel estimator 470, and the CSI of Equation 8, which are received from the CSI estimator 480. A process of receiving a signal to be transmitted will now be described prior to a Tx diversity processing process performed by the diversity processing unit 411.

Data/pilot 401 to be transmitted is input to a multiplexer 403 as a signal $D_k$. In addition, a preamble signal 402 for each burst to be transmitted in an OFDM system is to the multiplexer 403 as a signal $P_k$. The data/pilot 401 can be obtained using Equation 9, and the preamble signal can be obtained using Equation 10. Thus, a signal output from the multiplexer 403 can be obtained using Equation 11.

$$D_k = \text{Data}(k) \text{ or Pilot}(k), \ k = -\frac{N}{2}, \ldots, \frac{N}{2}-1 \quad (9)$$

$$P_k = \begin{cases} P_{EVEN}(k), & \text{if } P_{EVEN} \text{ is used} \\ P_{SUB}(k), & \text{if } P_{SUB} \text{ is used} \\ P_{STC}(k), & \text{if } P_{STC} \text{ is used} \end{cases} k = -\frac{N}{2}, \ldots, \frac{N}{2}-1 \quad (10)$$

$$E_k = \begin{cases} D_k & \text{if Data symbol} \\ P_k & \text{if Preamble symbol} \end{cases} k = -\frac{N}{2}, \ldots, \frac{N}{2}-1 \quad (11)$$

The multiplexer 403 outputs the signal obtained using Equation 11 to a mapping and modulation module 404. The signal output from the multiplexer 403 is mapped and modulated to a transmit symbol $M_k$ in a modulation method by the mapping and modulation module 404 and input to the diversity processing unit 411. As the modulation method, a method suggested to be used in a system is used. Thus, if the method suggested in a system is a binary phase shift keying (BPSK) method, the signal output from the multiplexer 403 is modulated in the BPSK method, and if the method is a quadrature phase shift keying (QPSK) method, the signal output from the multiplexer 403 is modulated in the QPSK method, and if the method is a high-order modulation method such as a 16-quadrature amplitude modulation (QAM) or 64-QAM method, the signal output from the multiplexer 403 is modulated in the 16-QAM or 64-QAM method."

The diversity processing unit 411 processes the modulated signal to provide Tx diversity in a method according to a preferred embodiment of the present invention. That is, as described above, a transmission method of the modulated symbol is determined in a Tx diversity method according to a preferred embodiment of the present invention using the channel estimation values received from the channel estimator 470 and the CSI received from the CSI estimator 480.

The Tx diversity method according to a preferred embodiment of the present invention uses Equation 12 or 13.

$$T_{0,k} = \begin{cases} M_k \times \dfrac{H^*_{00,k}}{|H_{00,k}|} & \text{if } C_{0,k} \geq C_{1,k} \\ 0 & \text{else} \end{cases}, k = -\dfrac{N}{2}, \ldots, \dfrac{N}{2}-1 \quad (12)$$

$$T_{1,k} = \begin{cases} M_k \times \dfrac{H^*_{10,k}}{|H_{10,k}|} & \text{if } C_{0,k} < C_{1,k} \\ 0 & \text{else} \end{cases}, k = -\dfrac{N}{2}, \ldots, \dfrac{N}{2}-1$$

$$T_{0,k} = \begin{cases} M_k & \text{if } C_{0,k} \geq C_{1,k} \\ 0 & \text{else} \end{cases}, k = -\dfrac{N}{2}, \ldots, \dfrac{N}{2}-1 \quad (13)$$

$$T_{1,k} = \begin{cases} M_k & \text{if } C_{0,k} < C_{1,k} \\ 0 & \text{else} \end{cases}, k = -\dfrac{N}{2}, \ldots, \dfrac{N}{2}-1$$

Equations 12 and 13 are selectively used as followings.

If the first Tx node uses a single antenna, and if the second Tx node providing Tx diversity according to a preferred embodiment of the present invention uses two antennas and uses a "$P_{EVEN}$+data" format burst structure, the diversity processing unit 411 uses Equation 12. If the first Tx node uses a single antenna, and if the second Tx node uses two antennas and uses a "$P_{SUB}$+data" format burst structure, the diversity processing unit 411 can use one of Equations 12 and 13.

If the first Tx node uses two antennas, and if the second Tx node uses two antennas and uses the "$P_{SUB}$+data" format burst structure, the diversity processing unit 411 can use Equation 13.

The Tx diversity concept of Equation 12 or 13 is a method of selecting an antenna path having greater power between two antennas for each sub-carrier based on CSI and transmitting a signal through the selected antenna path. If this method is used, since a spectral characteristic of a signal to be transmitted is actually the same as that of a single antenna, a spectral characteristic of the standard specification can be satisfied.

In addition, the method of Equation 12 is used when a burst structure uses a preamble with only even or odd sub-carriers having values. In this method, phase distortion is compensated for by multiplying selected sub-carriers by a phase component of a relevant channel. That is, the phase distortion is compensated for by multiplying a signal to be transmitted by a value obtained by dividing a conjugate complex by an absolute value of a channel estimation value.

That is, in a case where sub-carriers are simply selected compared to Equation 12, a receiver cannot perform appropriate interpolation, and therefore, the receiver cannot properly estimate a channel. Thus, a receive performance of the first Tx node is degraded. In other words, a Tx diversity effect can be obtained by using Equation 12 according to a preferred embodiment of the present invention.

The method of Equation 13 is used when a burst structure uses a preamble with both even and odd sub-carriers. In this method, a signal of an antenna path having greater power is simply selected for each sub-carrier and transmitted. If a phase of a signal is compensated and transmitted as illustrated in Equation 12 without simply selecting and transmitting a signal of an antenna path having greater power for each sub-carrier, an interference term due to a compensation structure is generated, and therefore, when the first Tx node operates as a receiver, i.e., when the first Tx node receives a signal transmitted from the second Tx node, it is difficult for the first Tx node to properly estimate a channel. Thus, when a burst structure uses a preamble with both even and odd sub-carriers, the Tx diversity effect according to a preferred embodiment of the present invention can be obtained by using Equation 13.

The diversity processing unit 411 determines a signal to be transmitted using Equation 12 or 13 according to the usage of a preamble of a burst to be transmitted. The determined Tx signal is one or all of $T_{0,k}$ and $T_{1,k}$. The signals $T_{0,k}$ and $T_{1,k}$ output from the diversity processing unit 411 are input to a first OFDM transmitter 420 and a second OFDM transmitter 430, respectively. Since the first OFDM transmitter 420 and the second OFDM transmitter 430 have the same structure and perform the same operation, only a configuration of the first OFDM transmitter 420 will be described.

The signal $T_{0,k}$ to be transmitted to the first antenna 442 is input to a first inverse FFT (IFFT) processing unit 421 of the first OFDM transmitter 420. The first IFFT processing unit 421 converts the signal $T_{0,k}$ in the frequency domain to a signal in the time domain and outputs the converted signal in the time domain to a guard interval inserter 422. The guard interval inserter 422 inserts a cyclic prefix symbol into the generated OFDM data as a guard interval.

The signals output from the first OFDM transmitter 420 and the second OFDM transmitter 430 are input to the first RF module 441 and the second RF module 443, respectively. Each of the first RF module 441 and the second RF module 443 up-converts the input signal to a signal of a frequency of a transmit band and transmits the up-converted signal to the first Tx node through the relevant antenna 442 or 444. The first Tx node operates as a receiver and receives the signals according to a conventional receiving method. That is, if the first Tx node has only one antenna, the first Tx node receives the signals using the antenna, and if the first Tx node has two antennas, the first Tx node receives the signals using the two antennas. In any case, since the Tx diversity scheme is used in the transmission, the first Tx node as a receiver can obtain a diversity gain.

Processes of transmitting a signal using the Tx diversity scheme according to a preferred embodiment of the present invention will now be described with reference to FIGS. 5 to 7.

Figure 5:
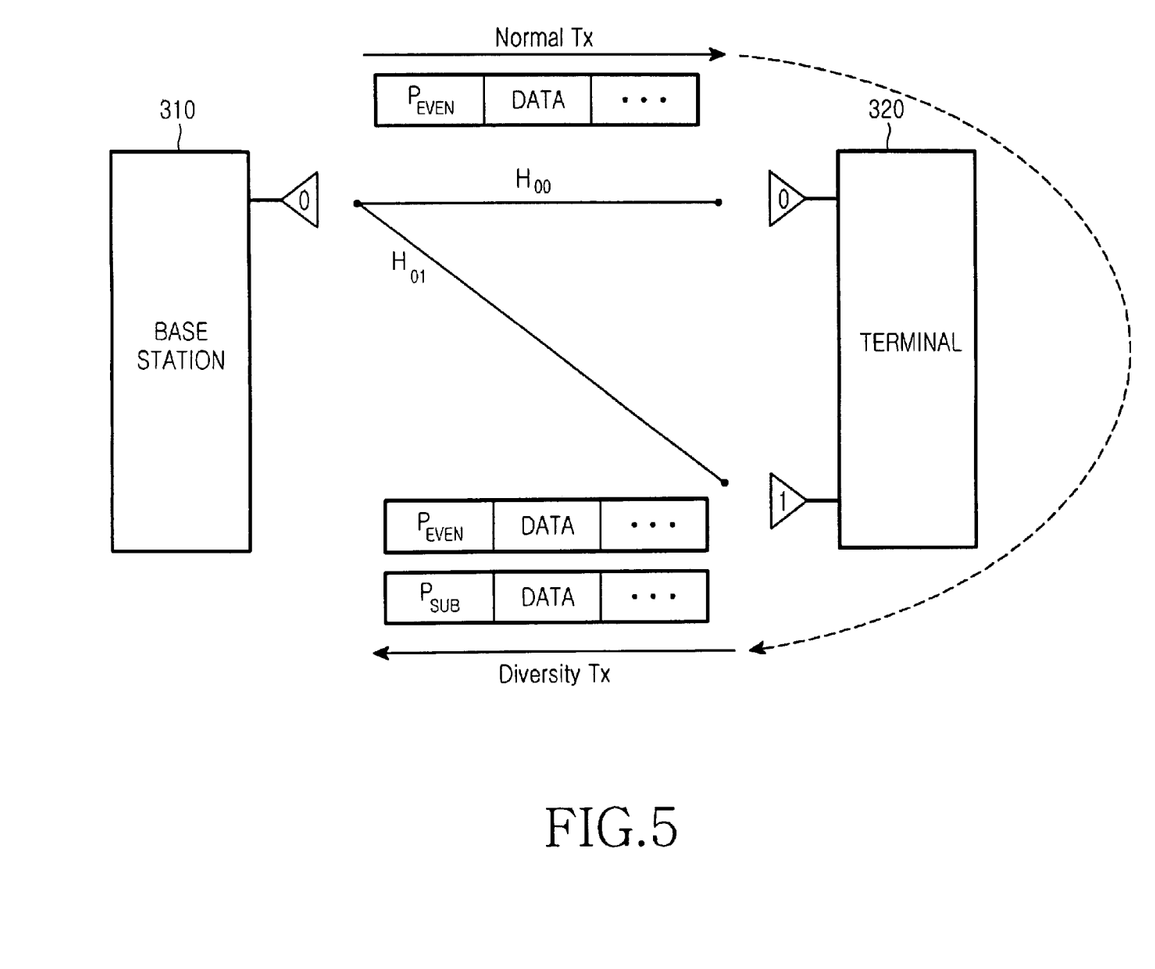
FIG. 5 is a conceptual diagram for explaining Tx diversity provided in a system having a 1×2 antenna structure according to a preferred embodiment of the present invention.

FIG. 5 is a conceptual diagram for explaining Tx diversity provided in a system having a 1×2 antenna structure according to a preferred embodiment of the present invention. A case of providing Tx diversity according to a preferred embodiment of the present invention in a system having a 1×2 antenna structure will now be described with reference to FIG. 5.

In FIG. 5, the base station 310 has one antenna, and the terminal 320 has two antennas. This is called a 1×2 multi-antenna system. FIG. 5 shows a configurable OFDM burst structure and a Tx diversity providing process in the 1×2 multi-antenna system. The Tx diversity providing process in the 1×2 multi-antenna system will now be described.

The base station 310 transmits a signal having a "$P_{EVEN}$+data" format DL burst structure in a conventional transmission method using a single antenna. That is, since the base station 310 includes only one antenna, bursts have the "$P_{EVEN}$+data" format described in the "description of the related art". The conventional transmission method is a method of transmitting a signal according to the specification defined in the standard of an OFDM system without using the Tx diversity scheme according to a preferred embodiment of the present invention.

The terminal 320 estimates $H_{00}$ and $H_{01}$ from the signal received through the two antennas and estimates CSI from the estimated $H_{00}$ and $H_{01}$. This is performed by the channel estimator 470 and the CSI estimator 480 of FIG. 4.

After estimating the channels and CSI, the terminal 320 determines a transmission method to provide Tx diversity according to a preferred embodiment of the present invention. That is, as described above, if a signal is transmitted in the "$P_{EVEN}$+data" format, the transmission is performed using Equation 12, and if the signal is transmitted in the "$P_{SUB}$+data" format, the transmission is performed using Equation 13.

The base station 310 receives the signal using the single antenna and processes the received signal in a conventional receiving method. The conventional receiving method is a method independent to the Tx diversity scheme according to a preferred embodiment of the present invention. That is, in the current embodiment, although the Tx diversity scheme is applied to the transmission signal, a receiver included in the base station 310 operates independently to whether Tx diversity is provided. In this case, since Tx diversity according to a preferred embodiment of the present invention has been already applied to the transmission signal, the receiver can obtain a diversity gain.

Figure 6:
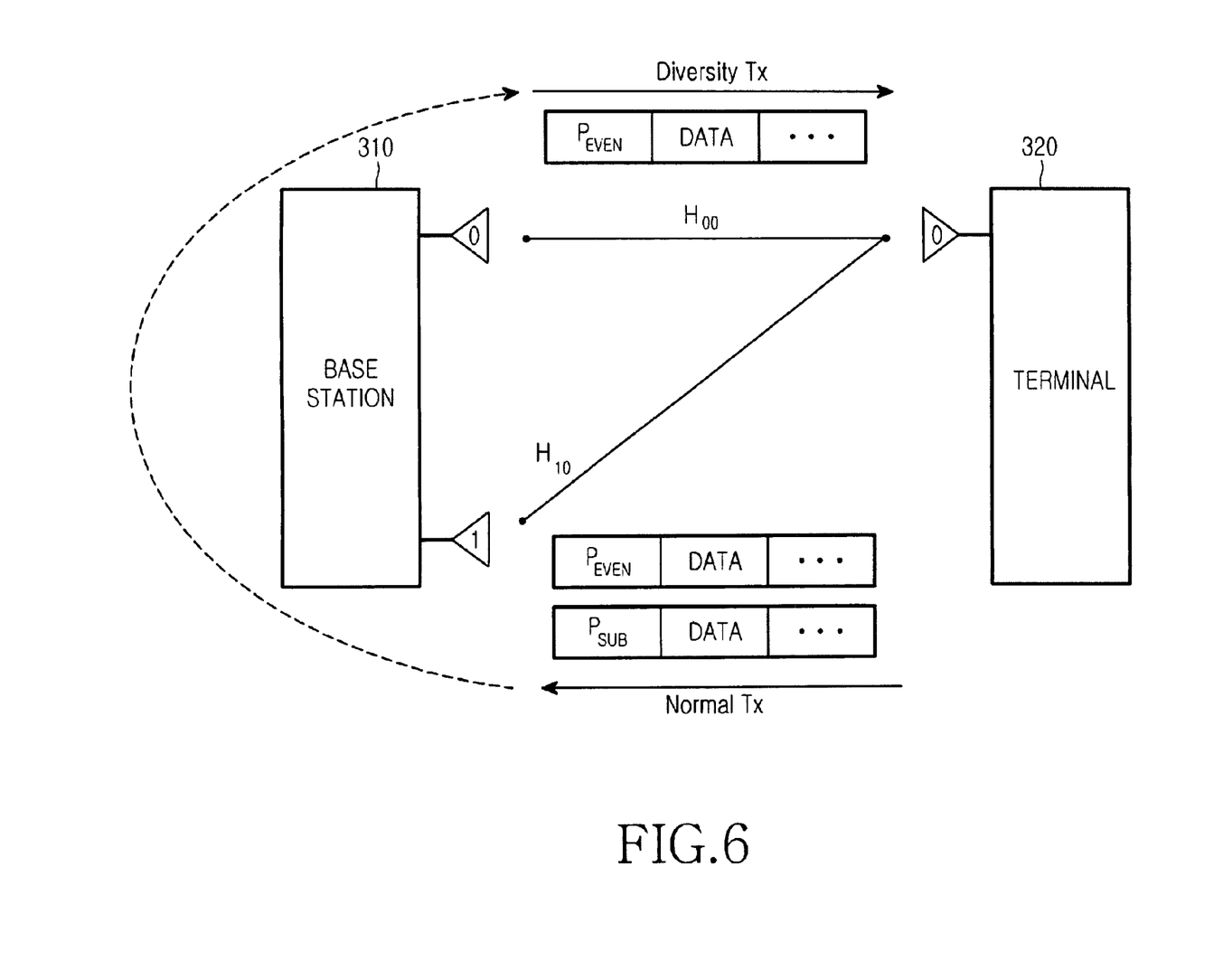
FIG. 6 is a conceptual diagram for explaining Tx diversity provided in a system having a 2×1 antenna structure according to another preferred embodiment of the present invention.

FIG. 6 is a conceptual diagram for explaining Tx diversity provided in a system having a 2×1 antenna structure according to another preferred embodiment of the present invention. A case of providing Tx diversity according to a preferred embodiment of the present invention in the system having a 2×1 antenna structure will now be described with reference to FIG. 6.

In FIG. 6, the base station 310 has two antennas, and the terminal 320 has one antenna. This is called a 2×1 multi-antenna system. FIG. 6 shows a configurable OFDM burst structure and a Tx diversity providing process in the 2×1 multi-antenna system. The Tx diversity providing process in the 2×1 multi-antenna system will now be described.

The terminal 320 transmits a signal having a "$P_{EVEN}$+data" or "$P_{SUB}$+data" format UL burst structure in a conventional transmission method using a single antenna. The conventional transmission method is the same method described in FIG. 5. The base station 310 estimates $H_{00}$ and $H_{10}$ from the signal received through the two antennas and estimates CSI from the estimated $H_{00}$ and $H_{10}$. The base station 310 transmits a signal through one or two antennas in a TX diversity method using the CSI and channel estimation values. In this case, the "$P_{EVEN}$+data" format is used for a DL burst structure. Thus, a phase of the signal is compensated for using Equation 12.

As described above, even if the base station 310 provides Tx diversity using the two antennas, the terminal 320 receives the signal in a conventional receiving method using the single antenna. The conventional receiving method is the same method described in FIG. 5. That is, in the current embodiment, although the terminal 320 uses the conventional receiving method, a diversity gain can be obtained since the base station 310 has already transmitted the signal using the Tx diversity scheme according to a preferred embodiment of the present invention.

Figure 7:
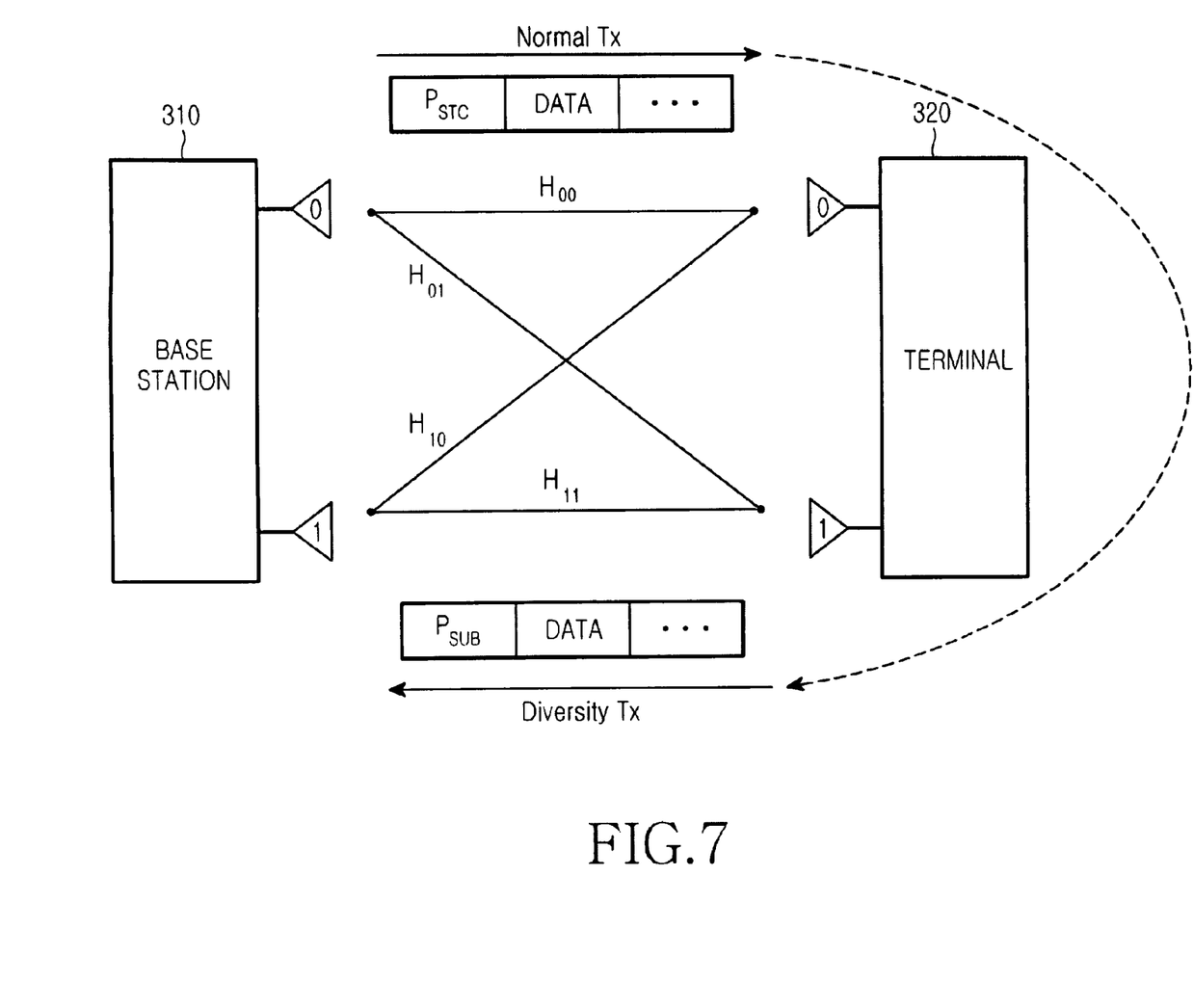
FIG. 7 is a conceptual diagram for explaining Tx diversity provided in a system having a 2×2 antenna structure according to another preferred embodiment of the present invention.

FIG. 7 is a conceptual diagram for explaining Tx diversity provided in a system having a 2×2 antenna structure according to another preferred embodiment of the present invention. A case of providing Tx diversity according to a preferred embodiment of the present invention in the system having a 2×2 antenna structure will now be described with reference to FIG. 7.

In FIG. 7, the base station 310 has two antennas, and the terminal 320 has two antennas. This is called a 2×2 multi-antenna system. FIG. 7 shows a configurable OFDM burst structure and a Tx diversity providing process in the 2×2 multi-antenna system. The Tx diversity providing process in the 2×2 multi-antenna system will now be described.

The base station 310 transmits a signal having a "$P_{STC}$+data" format DL burst structure in a conventional transmission method using the two antennas. Since the STC scheme defined in the standard specification is a kind of a Tx diversity scheme using a space-time-coding method, the Tx diversity scheme is already applied to the signal. Thus, when the STC scheme is used, even if the base station 310 includes two antennas, the STC Tx diversity scheme defined in the standard specification is used instead using the Tx diversity scheme according to a preferred embodiment of the present invention.

When the signal is transmitted through the two antennas, the terminal 320 receives the transmitted signal using two antennas, estimates $H_{00}$, $H_{01}$, $H_{10}$, and $H_{11}$ from the received signal, and estimates CSI from the estimated $H_{00}$, $H_{01}$, $H_{10}$, and $H_{11}$. The terminal 320 transmits a signal having a "$P_{SUB}$+data" format UL burst structure in a Tx diversity method through the two antennas using the Tx diversity scheme. In this case, the terminal 320 can transmit the signal using Equation 12 or 13.

The base station 310 receives the signal transmitted from the terminal using the two antennas and processes the received signal in a conventional receiving method. As described above, in the current embodiment, even if the base station 310 processes the received signal in the conventional receiving method, a diversity gain can be obtained since the terminal 320 has already transmitted the signal using the Tx diversity scheme according to a preferred embodiment of the present invention.

As described above, in a method of providing Tx diversity according to the embodiments of the present invention, the standard specification does not have to be changed, and a process of calculating a weight vector for beam-forming and other processes are not required, thereby simply providing Tx diversity.

In addition, by transmitting a signal in a transmitter after compensating for a phase of the signal, a receiver can easily estimate a channel, thereby reducing the waste of channel, and an additional hand-shaking process is not required, thereby reducing the waste of bandwidth.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of wireless communications, comprising:
   receiving, via a plurality of first antennas, a signal transmitted from one or more second antennas, wherein the number of first antennas is greater than or equal to the number of second antennas;
   estimating the channel between pairs of the first and second antennas;
   calculating channel state information (CSI) for each of the first antennas based on the estimated channel values, wherein the CSI value for each of the first antennas is calculated by adding the squares of the absolute values of the estimated channel values corresponding to the respective first antenna; and adjusting a modulated signal before transmission based on the CSI and estimated channel values.

2. A method of wireless communication, comprising:
receiving, via a plurality of first antennas, a signal transmitted from one or more second antennas, wherein the number of first antennas is greater than or equal to the number of second antennas;
estimating the channel between pairs of the first and second antennas;
calculating channel state information (CSI) for each of the first antennas based on the estimated channel values; and
adjusting a modulated signal before transmission based on the CSI and estimated channel values, wherein adjusting the modulated signal before transmission comprises:
determining an antenna, from the first antennas, having a maximum CSI value;
adjusting a phase of the modulated signal using a phase adjustment parameter; and
transmitting the adjusted modulated signal from the determined antenna and transmitting at least one of: a null signal and no signal from other antennas of the first antennas.

3. The method of claim 2, wherein the phase adjustment parameter is equal to one when a preamble used for OFDM transmission has a pattern in which signals exist across all subcarriers.

4. The method of claim 2, wherein the phase adjustment parameter comprises a ratio of a conjugate of a channel estimation value between the selected antenna and one of the second antennas and an absolute value of the same channel estimation value.

5. The method of claim 4, wherein the adjusted modulation signal is transmitted using only even OFDM subcarriers.

6. An apparatus for wireless communications, comprising:
a receiver for receiving, via a plurality of first antennas, a signal transmitted from one or more second antennas, wherein the number of first antennas is greater than or equal to the number of second antennas;
a channel estimator for estimating the channel between pairs of the first and second antennas;
a calculating channel state information (CSI) estimator for estimating CSI for each of the plurality of first antennas based on the estimated channel values, wherein the CSI value for each of the first antennas is calculated by adding the squares of the absolute values of the estimated channel values corresponding to the respective first antenna; and
a diversity processor for adjusting a modulated signal before transmission based on the CSI and estimated channel values.

7. An apparatus for wireless communications, comprising:
a receiver for receiving, via a plurality of first antennas, a signal transmitted from one or more second antennas, wherein the number of first antennas is greater than or equal to the number of second antennas;
a channel estimator for estimating the channel between pairs of the first and second antennas;
a calculating channel state information (CSI) estimator for estimating CSI for each of the plurality of first antennas based on the estimated channel values; and
a diversity processor for adjusting a modulated signal before transmission based on the CSI and estimated channel values, wherein the diversity processor adjusts the modulated signal before transmission by:
determining an antenna, from the first antennas, having a maximum CSI value;
adjusting a phase of the modulated signal using a phase adjustment parameter; and
transmitting the adjusted modulated signal from the determined antenna and transmitting at least one of: a null signal and no signal from other antennas of the first antennas.

8. The apparatus of claim 7, wherein the phase adjustment parameter is equal to one when a preamble used for OFDM transmission has a pattern in which signals exist across all subcarriers.

9. The apparatus of claim 7, wherein the phase adjustment parameter comprises a ratio of a conjugate of a channel estimation value between the selected antenna and one of the second antennas and an absolute value of the same channel estimation value.

10. The apparatus of claim 9, wherein the diversity processor transmits the adjusted modulation signal using only even OFDM subcarriers.

11. A base station, comprising:
a plurality of first antennas;
a receiver for receiving, via the plurality of first antennas, a signal transmitted from one or more second antennas of a user terminal, wherein the number of first antennas is greater than or equal to the number of second antennas;
a channel estimator for estimating the channel between pairs of the first and second antennas;
a calculating channel state information (CSI) estimator for estimating CSI for each of the plurality of first antennas based on the estimated channel values, wherein the CSI value for each of the first antennas is calculated by adding the squares of the absolute values of the estimated channel values corresponding to the respective first antenna; and
a diversity processor for adjusting a modulated signal before transmission based on the CSI and estimated channel values.

12. A user terminal, comprising:
a plurality of first antennas;
a receiver for receiving, via the plurality of first antennas, a signal transmitted from one or more second antennas of a base station, wherein the number of first antennas is greater than or equal to the number of second antennas;
a channel estimator for estimating the channel between pairs of the first and second antennas;
a calculating channel state information (CSI) estimator for estimating CSI for each of the plurality of first antennas based on the estimated channel values, wherein the CSI value for each of the first antennas is calculated by adding the squares of the absolute values of the estimated channel values corresponding to the respective first antenna; and
a diversity processor for adjusting a modulated signal before transmission based on the CSI and estimated channel values.

13. A base station, comprising:
a plurality of first antennas;
a receiver for receiving, via a plurality of first antennas, a signal transmitted from one or more second antennas, wherein the number of first antennas is greater than or equal to the number of second antennas;
a channel estimator for estimating the channel between pairs of the first and second antennas;
a calculating channel state information (CSI) estimator for estimating CSI for each of the plurality of first antennas based on the estimated channel values; and a diversity processor for adjusting a modulated signal before transmission based on the CSI and estimated channel values, wherein the diversity processor adjusts the modulated signal before transmission by:

determining an antenna, from the first antennas, having a maximum CSI value;

adjusting a phase of the modulated signal using a phase adjustment parameter; and transmitting the adjusted modulated signal from the determined antenna and transmitting at least one of: a null signal and no signal from other antennas of the first antennas.

14. A user terminal, comprising:

a plurality of first antennas;

a receiver for receiving, via a plurality of first antennas, a signal transmitted from one or more second antennas, wherein the number of first antennas is greater than or equal to the number of second antennas;

a channel estimator for estimating the channel between pairs of the first and second antennas;

a calculating channel state information (CSI) estimator for estimating CSI for each of the plurality of first antennas based on the estimated channel values; and a diversity processor for adjusting a modulated signal before transmission based on the CSI and estimated channel values, wherein the diversity processor adjusts the modulated signal before transmission by:

determining an antenna, from the first antennas, having a maximum CSI value;

adjusting a phase of the modulated signal using a phase adjustment parameter; and transmitting the adjusted modulated signal from the determined antenna and transmitting at least one of: a null signal and no signal from other antennas of the first antennas.

* * * * *

UNITED STATES PATENT AND TRADEMARK OFFICE
CERTIFICATE OF CORRECTION

PATENT NO. : 7,835,426 B2  
APPLICATION NO. : 11/452471  
DATED : November 16, 2010  
INVENTOR(S) : Park et al.

Page 1 of 1

It is certified that error appears in the above-identified patent and that said Letters Patent is hereby corrected as shown below:

Column 14, line 62, claim 1: "the channel" to read as --a channel--

Column 15, line 10, claim 2: "the channel" to read as --a channel--

Column 16, line 59, claim 13: "a plurality of first antennas," to read as --the plurality of first antennas,--

Column 17, line 16, claim 14: "a plurality of first antennas," to read as --the plurality of first antennas,--

Signed and Sealed this
Fourth Day of September, 2012

David J. Kappos
*Director of the United States Patent and Trademark Office*